Aug. 3, 1948.  W. H. GILLE  2,446,325
LEVELING SUPPORT
Filed Sept. 24, 1942   2 Sheets-Sheet 1
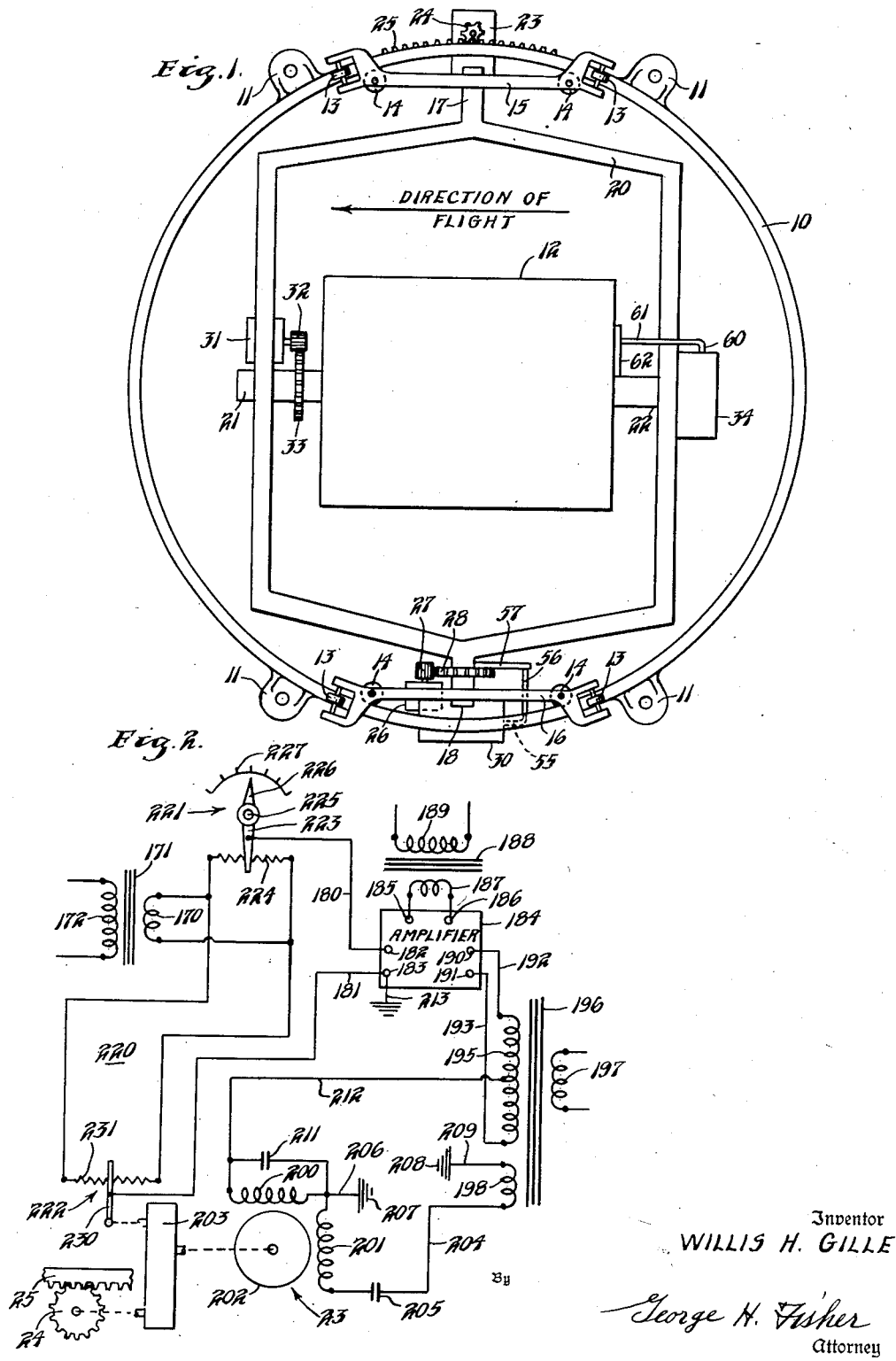
Inventor
WILLIS H. GILLE
By
George H. Fisher
Attorney Aug. 3, 1948. W. H. GILLE 2,446,325
LEVELING SUPPORT
Filed Sept. 24, 1942 2 Sheets-Sheet 2
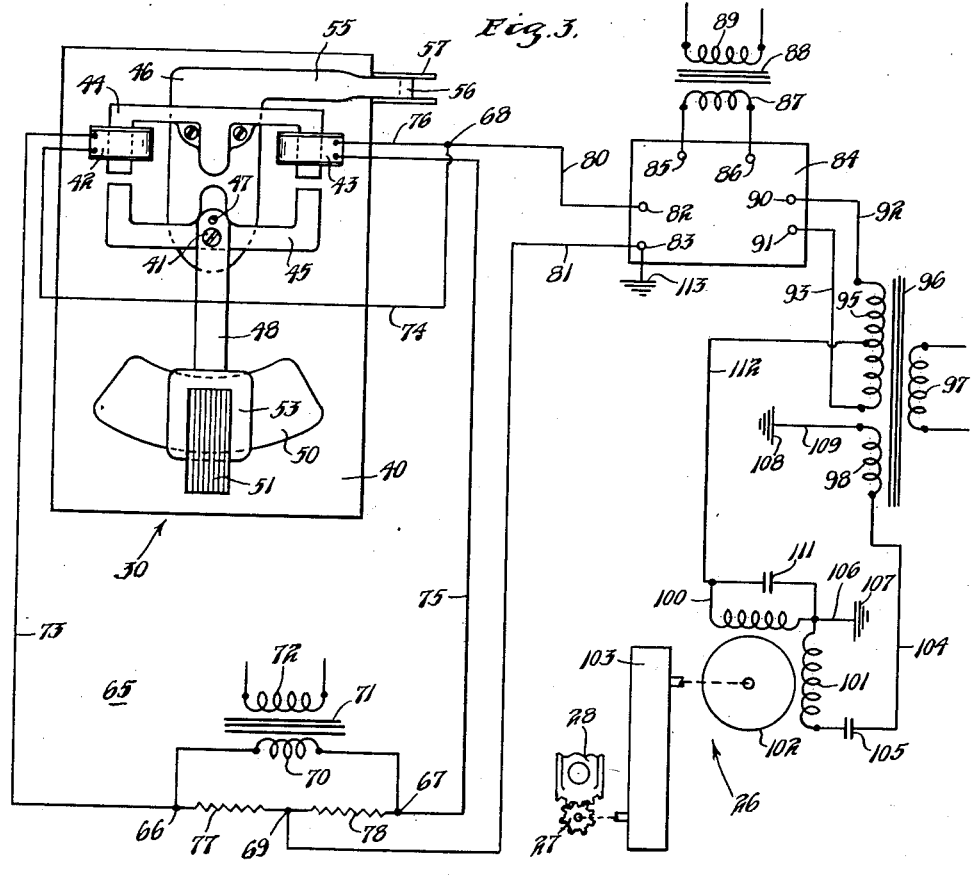
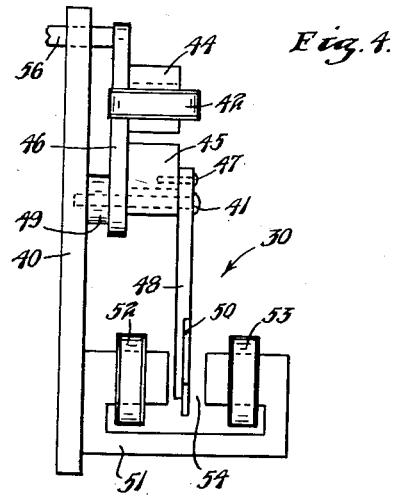
Inventor
WILLIS H. GILLE
By
George H. Fisher
Attorney Patented Aug. 3, 1948

2,446,325

UNITED STATES PATENT OFFICE 2,446,325

LEVELING SUPPORT

Willis H. Gille, St. Paul, Minn., assignor to Minneapolis-Honeywell Regulator Company, Minneapolis, Minn., a corporation of Delaware Application September 24, 1942, Serial No. 459,541

8 Claims. (Cl. 318—19)

The present invention relates to leveling supports, and especially to that type of support in which the supported member is maintained in its desired position by automatically controlled motor means.

An object of the present invention is to provide improved means for automatically maintaining a supported device in a desired angular position with respect to its underlying support.

Another object of the present invention is to provide an improved device of the type shown in the co-pending application of Siegfried G. Isserstedt, Serial No. 459,439½, filed September 23, 1942.

Another object of the present invention is to provide improved means for automatically maintaining a supported device in a horizontal position.

A further object of the present invention is to provide improved means of the type described which is adapted for use with an aerial camera to maintain the camera level.

A further object of this invention is to provide improved means for controlling a motor which positions a supported device relative to its underlying support.

A still further object is to provide an improved gravity responsive pick-up unit for controlling a motor in such a system.

Other objects and advantages of the present invention will become apparent from a consideration of the accompanying specification, claims and drawing, in which Figure 1 is a plan view of a leveling support for an aerial camera embodying the principles of my invention;

Figure 2 is an electrical circuit diagram for the control of one of the motors used in connection with the device of Figure 1;

Figure 3 is a composite figure showing in elevation a gravity responsive pick-up unit used in the system of Figure 1, and an electrical circuit diagram of a motor control system controlled by that pick-up unit, and Figure 4 is a side elevation of the gravity responsive pick-up unit shown in Figure 3.

Referring now to Figure 1, there is shown a circular frame member 10 on which are four integrally formed ears 11 adapted to attach the frame member 10 to a suitable underlying support. By way of example, it may be assumed that the underlying support is an aircraft, and that the ears 11 maintain the frame member 10 in a registering relationship with a hole in the bottom of the aircraft through which a camera 12 supported by the frame member 10 may take pictures of the territory over which the plane is flying.

The upper surface of the frame member 10 is level and smooth so as to form a track for a set of four rollers 13. The inner face of the frame member 10 is also smooth and serves as a track for a second set of rollers 14. A carriage 15, appearing in the upper part of Figure 1 in the drawing, rides on two of the rollers 13 and carries two of the rollers 14. Another carriage 16, appearing in the lower part of Figure 1 of the drawing, is supported by the other two rollers 13 and carries the other two rollers 14. The carriages 15 and 16 are centrally apertured to receive trunnions 17 and 18 of a gimbal 20. The assembly is such that the rollers 14 maintain the gimbal 20 and the carriages 15 and 16 centered in respect to the frame member 10, so that the rollers 13 ride properly on their associated track.

The gimbal 20 is apertured at diametrically opposite points along an axis at right angles to the axis passing through the trunnions 17 and 18, to receive trunnions 21 and 22, which are attached to the camera 12.

A motor shown somewhat diagrammatically at 23, drives a pinion 24 which engages an arcuate rack 25 attached to the frame member 10. The motor 23 is carried by the carriage 15, and therefore moves with the assembly comprising the carriages 15 and 16, the gimbal 20, and the camera 12, when the motor is energized to drive the pinion 24 along the rack 25. The control circuit for motor 23 is disclosed in detail in Figure 2.

Another motor 26, hereinafter referred to as the pitch motor, is carrier by the carriage 16 and drives a pinion 27 which mates with a gear 28 fixed on the trunnion 18 of gimbal 20. The motor 26 is controlled by a circuit shown in detail in Figure 3, including a pick-up unit 30, carried by the carriage 16 in alignment with the axis passing through trunnions 17 and 18. The constructional details of the pick-up unit 30, which is shown diagrammatically in Figure 1, are shown in Figures 3 and 4.

A third motor 31, hereinafter referred to as the roll motor, is carried by the gimbal 20 at a point adjacent the trunnion 21 of camera 12. The motor 31 drives a pinion 32 which engages a gear 33 fixed on the trunnion 21. The motor 31 is controlled by a circuit similar to that disclosed in Figure 3 and controlled by a pick-up unit 34, which is structurally similar to the pick-up unit 30.

Referring now to the pick-up unit 30 as disclosed in Figures 3 and 4, this unit is shown as being supported by a base 40 which is fixed on the carriage 16 by any suitable means. The base 40 carries a stub shaft 41 at an intermediate point thereon.

The pick-up unit 30 includes two electrical coils 42 and 43. A magnetic circuit for the coils 42 and 43 is provided which consists of two core members 44 and 45. For the sake of clarity in this description, the upper core member 44, which carries the coils 42 and 43, will be hereinafter referred to as the core, while the lower core member 45 will be hereinafter referred to as the armature. It should be understood, however, that the coils 42 and 43 may be carried by either of the two core members with equal facility.

The two core members 44 and 45 are E-shaped, and the projecting legs of the two E-shaped members extend toward each other in complementary relationship. The functioning of the two coils 42 and 43 and their associated magnetic circuit is disclosed in detail in the co-pending application of Willis H. Gille and Harold A. Petsch, Serial No. 453,914, filed August 6, 1942, now Patent No. 2,371,236, dated March 13, 1945.

The core 44 is fixed on a plate 46, which is freely pivoted on the stub shaft 41. A spacer 49 separates the plate 46 from the base 40. The armature 45 is also freely pivoted on the shaft 41. A downwardly extending arm 48, which serves as a pendulum and is hereinafter referred to as such, is fixed to the armature 45 by any suitable means, as for example the pin 47. The lower end of the pendulum 48 carries a vane 50 which extends laterally therefrom in both directions. A magnetic core 51 is fixed on the base 40, and is provided with a pair of electrical windings 52 and 53. The core 51 is provided with an air gap at 54 in which the vane 50 and the lower end of pendulum 48 move. The vane 50 is arcuate in form, so that for any angular position of the pendulum 48 within its normal range of movement, the vane 50 lies within the air gap 54. The coils 52 and 53 may be energized from any suitable source of electrical energy, not shown.

The upper end of the plate 46 is provided with a lateral extension 55, which terminates in a rearwardly extending portion 56 adapted to engage a slot in a guide member 57, which is fixed on a suitable portion of the gimbal 20.

The pick-up unit 34 is similar in structure to the pick-up unit 30, and will not be discussed in detail. Referring to Figure 1, it is noted that the pick-up unit 34 is provided with a laterally extending arm 60 corresponding to the extension 55 on the pick-up unit 30. The arm 60 has a rearwardly extending portion 61 which engages a suitable guide member 62 fixed on the camera 12.

Referring now to the motor control circuit shown in Figure 3, it will be seen that the pick-up coils 42 and 43 are connected in adjacent arms of a Wheatstone bridge circuit generally indicated at 65, having input terminals 66 and 67, and output terminals 68 and 69. The bridge circuit 65 is supplied with electrical energy from the secondary winding 70 of a transformer 71 having a primary winding 72.

The upper left arm of the bridge circuit, as it appears in Figure 3, may be traced from input terminal 66 through a conductor 73, coil 42, and a conductor 74 to output terminal 68. The upper right-hand arm of the bridge circuit 65 may be traced from input terminal 67 through a conductor 75, coil 43, and a conductor 76 to output terminal 69. The lower left arm of bridge circuit 65 may be traced from input terminal 66 through a fixed impedance or resistance 77 to output terminal 68. The lower right-hand arm of the bridge circuit 65 may be traced from input terminal 67 through a fixed impedance or resistance 78 to output terminal 69.

The output terminals 68 and 69 of bridge circuit 65 are connected through conductors 80 and 81, respectively, to input terminals 82 and 83 of an electronic amplifier generally indicated at 84. The amplifier 84 may conveniently be of the type described in Figure 1 of the co-pending application of Albert P. Upton, Serial No. 437,561, filed April 3, 1942, now Patent No. 2,423,534, dated July 8, 1947.

The amplifier 84 is supplied with a pair of power supply terminals 85 and 86 which are connected to a secondary winding 87 of a transformer 88 having a primary winding 89. The amplifier 84 is also provided with output terminals 90 and 91 which are connected by conductors 92 and 93, respectively, to the opposite terminals of a secondary winding 95 of a transformer 96 having a primary winding 97.

Although the transformers 71, 88 and 96 are shown as separate units, a single transformer may conveniently be used. If a single transformer is not used, the primary windings 72, 89 and 97 should be connected to the same source of alternating electrical energy in order that the proper phase relations will be retained in the control circuit.

The motor 26, which is controlled by the pick-up unit 30, is of the split phase type and includes a pair of field windings 100 and 101 associated with a rotor 102, which drives the pinion 27 through a gear train indicated schematically at 103. The field winding 101 of motor 26 is supplied with electrical energy from a secondary winding 98 upon the transformer 96 through a circuit which may be traced from the lower terminal of secondary winding 98 through a conductor 104, a condenser 105, winding 101, a conductor 106, ground connections 107 and 108, and conductor 109 to the upper terminal of secondary winding 98.

The winding 100 of motor 26 is supplied with electrical energy from secondary winding 95 of transformer 96, and this supply of energy is controlled by the amplifier 84. A condenser 111 is connected in parallel with winding 100. The left-hand terminal of winding 100 is connected to a center tap on transformer winding 95 by a conductor 112, and the right-hand terminal of field winding 100 is connected to ground through conductor 106 and connection 107. The input terminal 83 of amplifier 84 is connected to ground, at 113.

The operation of the circuit of Figure 3 is more completely described in the co-pending applications of Upton and of Gille and Petsch, previously referred to. For the purposes of the present application, it will be outlined as follows:

When the bridge circuit 65 is balanced, which occurs when the reluctance of the magnetic circuits of coils 42 and 43 are equal, there is no difference of potential between the output terminals 68 and 69, and hence no signal is applied to the input terminals 82 and 83 of amplifier 84. Under these conditions, the current supplied to the winding 100 of motor 26 is not sufficient in quantity nor of the proper phase relation to cooperate with the current continuously supplied to winding 101 through transformer secondary 98 in order to cause rotation of the motor.

Assume that the base 40 is tilted slightly to the left from the vertical position shown in Figure 3. Under these conditions the pendulum 48 tends to remain in a vertical position and hence moves slightly clockwise about the shaft 41. This decreases the air gap in the magnetic circuit of the coil 42, and increases the air gap in the magnetic circuit of coil 43. The impedance of coil 42 is therefore increased, while the impedance of coil 43 is decreased. This change in impedance of the coils 42 and 43 unbalances the bridge circuit 65 in a sense such that the potential of output terminal 68 approaches that of output terminal 67. The potential of output terminal 69 is substantially constant, and therefore an alternating potential appears between output terminals 68 and 69 and is impressed on the input terminals 82 and 83 of amplifier 84. The amplifier 84 responds to this alternating potential and supplies the motor winding 100 with an alternating current of sufficient magnitude to cause rotation of motor 26. The phase of the alternating current supplied to winding 100 is controlled by the phase of the signal potential applied to input terminals 82 and 83, and is of the proper phase so that motor 26, in driving the gimbal 20 through pinion 27 and gear 28, moves the guide 57 downwardly. This downward movement of guide 57, transmitted through extension 55 of plate 46, causes a clockwise movement of the plate 46 about its pivot 47, which clockwise movement tends to move the core 44 to a position wherein the magnetic circuits of the coils 42 and 43 are again equal. When the motor has moved sufficiently so that the magnetic circuits of coils 42 and 43 are equalized, the signal applied to amplifier 84 is again reduced to zero and the motor stops.

When the base 40 is tilted to the right, as it appears in Figure 3, thereby moving pendulum 48 and armature 45 counterclockwise about the shaft 41, the operation of the circuit is analogous to that just described. The only difference is that the bridge circuit is unbalanced in the opposite direction, and that therefore the signal impressed on the input terminals of amplifier 84 and hence the current supplied by the output circuit of amplifier 84 to motor winding 100 is opposite in phase to that obtained under the conditions previously described. This causes rotation of motor 28 in the opposite direction, and produces a follow-up movement of plate 46 in a counter-clockwise direction to rebalance the bridge circuit.

Referring now to the operation of the device shown in Figure 1, let it be assumed that the direction of flight of the aircraft in which this device is mounted is to the left, as indicated by the legend in the drawing. If under flight conditions, the nose of the aircraft becomes elevated or depressed, due to a climb or dive, the pick-up unit 30 responds as described above in connection with Figure 3 to cause operation of motor 26 in the proper direction to drive gimbal 20 back to a horizontal position. As soon as the horizontal position is reached, the pick-up unit 30 is again balanced and the motor is stopped.

In a similar manner, if the aircraft tilts to the left or right, the pick-up unit 34 controls the roll motor 31, causing it to rotate in the proper direction to drive the camera 12 back to a horizontal position with respect to the longitudinal axis of the aircraft.

The electromagnet comprising the core 51 and the windings 52 and 53 is provided to exert a damping effect on the pendulum 48, so as to prevent the oscillations thereof which are inherent in any pendulum. The vane 50 is therefore constructed of electrically conductive material, and upon motion of the vane 50 through the magnetic field setup in the air gap 54 by the coils 52 and 53, eddy currents are set up in the vane 50 by the magnetic field which tend to retard its motion. It should be noted that since the follow-up movement of the core 44 is accomplished without relative movement of the electromagnet core 51 and the vane 50, the aforesaid follow-up movement has no tendency to cause motion of the pendulum 48, which might occur if the follow-up movement were obtained by moving the base 40 and the electromagnetic core 51 relative to the vane 50.

Referring now to Figure 2 there is shown a control circuit for the azimuth motor 24. This circuit is generally similar to that disclosed and described in connection with Figure 3, the chief difference being that a substantially different bridge circuit including a different type of control and follow-up mechanism is employed. Therefore, in the circuit of Figure 2 those circuit elements which correspond to similar elements in Figure 3 have been assigned reference characters similar to the corresponding reference characters of Figure 3, but differing therefrom by one hundred. For example, conductor 89 of Figure 3 corresponds to conductor 189 of Figure 2, and conductor 104 of Figure 3 corresponds to conductor 204 of Figure 2.

The bridge circuit 220 of Figure 2 includes a manual controller 221, which may be operated by the pilot or other member of the crew of the aircraft, and a follow-up controller 222, which is driven by the motor 24 through the gear train 203. The manual controller 221 includes a slider 223 movable with respect to a slide wire resistance 224. The slider 223 functions as one of the output terminals of the bridge circuit 220. The slider 223 is rotatable by means of a knob 225 which also moves a pointer 226 with respect to a scale 227. The follow-up controller 222 includes a slider 230 which is movable along a slide wire resistance 231. The slider 230 serves as the other output terminal of the bridge circuit 220.

In operation, the pilot moves the knob 225 until the pointer 226 indicates on the scale 227 the angle of drift of the aircraft. The angle of drift is the angle between the longitudinal axis of the aircraft and its actual direction of movement through the air. This angle must be introduced to compensate for cross winds. When the pilot operates the controller 221, a signal of the proper phase is impressed on the input terminals of amplifier 184 to cause motor 24 to drive the pinion 24 along rack 25, thereby rotating the camera 12 about a vertical axis so as to align it with the true direction of flight of the aircraft. At the same time, the follow-up controller 222 is operated to rebalance the bridge circuit 220. When the rebalancing is completed, the motor 24 stops, leaving the camera aligned in the proper direction.

While I have shown and described a preferred embodiment of my invention, other modifications thereof will readily occur to those skilled in the art, and I therefore wish my invention to be limited only by the appended claims.

I claim as my invention:

1. In a leveling system: a device to be maintained in a level attitude; a frame subject to change in attitude; gimbal means, rotatable about a vertical axis, supporting said device in said frame for rotation about two mutually perpendicular, normally level axes; a pair of substantially free pendulums supported by said frame for angular displacement with respect thereto on departure of said frame from said level attitude; means, each comprising first and second cooperatively movable portions, giving a response proportional in magnitude to the magnitude of the displacement between said portions; motor means for causing relative rotation, about each said normally level axis, between said device and said frame; means mounting each said first portion for angular movement, with respect to said frame, unitary with motor actuated movement of said device, and means mounting each said second portion, in cooperative relationship with its associated first portion, on one of said pendulums for unitary movement therewith, whereby relative movement may take place between said portions both due to the constantly vertical force of gravity and due to the operation of said motor means; and means operatively associating said responsive means with said motor means for energization thereof in accordance with the response of said responsive means.

2. In a leveling system: a device to be maintained in a level attitude; a frame subject to change in attitude; gimbal means, rotatable about a vertical axis, supporting said device in said frame for rotation about two mutually perpendicular, normally level axes; a pair of substantially free pendulums supported by said frame for angular displacement with respect thereto on departure of said frame from said level attitude; means, each comprising first and second cooperatively movable portions, giving a response proportional in magnitude to the magnitude of the displacement between said portions; motor means for causing relative rotation, about each said normally level axis, between said device and said frame; means mounting each said first portion for angular movement, with respect to said frame, unitary with motor actuated movement of said device, and means mounting each said second portion, in cooperative relationship with its associated first portion, on one of said pendulums for unitary movement therewith, whereby relative movement may take place between said portions both due to the constantly vertical force of gravity and due to the operation of said motor means; means operatively associating said responsive means with said motor means for energization thereof in accordance with the response of said responsive means; and means damping oscillations of said pendulum with respect to said frame.

3. In a leveling system: a device to be maintained in a level attitude; a frame subject to change in attitude; gimbal means, rotatable about a vertical axis, supporting said device in said frame for rotation about two mutually perpendicular, normally level axes; a pair of substantially free pendulums supported by said frame for angular displacement with respect thereto on departure of said frame from said level attitude; means, each comprising first and second cooperatively movable portions, giving a response proportional in magnitude to the magnitude of the displacement between said portions; motor means for causing relative rotation, about each normally level axis, between said device and said frame; means mounting each said first portion for angular movement, with respect to said frame, unitary with motor actuated movement of said device, and means mounting each said second portion, in cooperative relationship with its associated first portion, on one of said pendulums for unitary movement therewith, whereby relative movement may take place between said portions both due to the constantly vertical force of gravity and due to the operation of said motor means; and electronic motor control means operatively associating said responsive means with said motor means for energization thereof in accordance with the response of said responsive means.

4. In a leveling system: a device to be maintained in a level attitude; a frame subject to change in attitude; gimbal means, rotatable about a vertical axis, supporting said device in said frame for rotation about two mutually perpendicular, normally level axes; a pair of substantially free pendulums supported by said frame for angular displacement with respect thereto on departure of said frame from said level attitude; impedance ratio adjusting means continuously variable about a mean ratio value, each said means comprising first and second cooperatively movable portions, the change in said ratio from said mean value being proportional in magnitude to the magnitude of the displacement between said portions; motor means for causing relative rotation, about each said normally level axis, between said device and said frame; means mounting each said first portion for angular movement, with respect to said frame, unitary with motor actuated movement of said device, and means mounting each said second portion, in cooperative relationship with its associated first portion, on one of said pendulums for unitary movement therewith, whereby relative movement may take place between said portions both due to the constantly vertical force of gravity and due to the operation of said motor means; and means operatively associating said responsive means with said motor means for energization thereof in accordance with the response of said responsive means.

5. In a leveling system: a device to be maintained in a level attitude; a frame subject to change in attitude; gimbal means, rotatable about a vertical axis, supporting said device in said frame for rotation about two mutually perpendicular, normally level axes; a pair of components, each comprising two cooperating portions relatively movable about one of said axes, giving electrical responses which vary with the magnitude of the displacement between said portions, each said component comprising first and second members, the first of which is pendulous, supported by said frame for pivotal movement with respect to said frame and to each other, and means mounting upon said members respectively first and second means cooperating to vary the ratio of two impedances on change in the relative positions of said portions; means connecting each said second member with said device for unitary movement therewith, relative to said frame; motor means for causing relative rotation, about each said normally level axis, between said device and said frame; and means affected by the magnitude of said impedance ratio, for energizing said motor means.

6. In a leveling system: a device to be maintained in a level attitude; a frame subject to change in attitude; gimbal means, rotatable about a vertical axis, supporting said device in said frame for rotation about two mutually perpendicular, normally level axes; a pair of components, each comprising two cooperating portions relatively movable about one of said axes, giving electrical responses which vary with the magnitude of the displacement between said portions, each said component comprising first and second members, the first of which is pendulous, supported by said frame for pivotal movement with respect to said frame and to each other, and means mounting upon said members respectively first and second means cooperating to vary the ratio of two impedances on change in the relative positions of said portions; means carried in part by each said pendulous member for damping oscillation thereof; means connecting each said second member with said device for unitary movement therewith, relative to said frame; motor means for causing relative rotation, about each said normally level axis, between said device and said frame; and means affected by the magnitude of said impedance ratio, for energizing said motor means.

7. In a leveling system: a device to be maintained in a level attitude; a frame subject to change in attitude; gimbal means, rotatable about a vertical axis, supporting said device in said frame for rotation about two mutually perpendicular normally level axes; an impedance ratio varying device for responding to change in the attitude of said frame, both with respect to the vertical and with respect to the attitude of said device, about one of said normally level axes, said device comprising impedance means, impedance varying means, and pendulous and pivoted means each carrying one of said last named means; means connecting said pivoted means with said device for unitary movement therewith relative to said frame; motor means for causing relative movement between said device and said frame about said one axis; and electronic motor control means including said impedance means for energizing said motor in accordance with displacement in the attitude of said frame from level.

8. In a leveling system: a device to be maintained in a level attitude; a frame subject to change in attitude; gimbal means, rotatable about a vertical axis, supporting said device in said frame for rotation about two mutually perpendicular, normally level axes; an impedance ratio varying device for responding to change in the attitude of said frame, both with respect to the vertical and with respect to the attitude of said device, about one of said normally level axes, said device comprising impedance means, impedance varying means, and pendulous and pivoted means each carrying one of said last named means; means carried in part by said pendulous means for damping oscillation thereof; means connecting said pivoted means with said device for unitary movement therewith relative to said frame; motor means for causing relative movement between said device and said frame about said one axis; and electronic motor control means including said impedance means for energizing said motor in accordance with displacement in the attitude of said frame from level.

WILLIS H. GILLE.

REFERENCES CITED

The following references are of record in the file of this patent:

UNITED STATES PATENTS

| Number | Name | Date |
| --- | --- | --- |
| Re. 13,514 | Ryan | Jan. 14, 1913 |
| 1,585,484 | Gasser | May 18, 1926 |
| 1,586,233 | Anschutz-Kaempfe | May 25, 1936 |
| 1,679,354 | Fairchild et al. | Aug. 7, 1928 |
| 1,840,104 | Anschutz-Kaempfe | Jan. 5, 1932 |
| 1,942,604 | Kennedy | Jan. 9, 1934 |
| 2,013,106 | Nagel et al. | Sept. 3, 1935 |
| 2,014,825 | Watson | Sept. 17, 1935 |
| 2,116,593 | Bouvier et al. | May 10, 1938 |
| 2,293,502 | Hermann | Aug. 18, 1942 |
| 2,371,236 | Gille | Mar. 13, 1945 |

FOREIGN PATENTS

| Number | Country | Date |
| --- | --- | --- |
| 267,821 | Germany | Dec. 1, 1913 |
| 321,744 | Germany | June 12, 1920 |
| 439,227 | Germany | Jan. 12, 1927 |
| 265,949 | Great Britain | July 28, 1927 |